Sept. 2, 1941.  A. RONNING  2,254,451
MOUNTING FOR VEHICLE WHEELS
Filed July 15, 1938  2 Sheets-Sheet 1
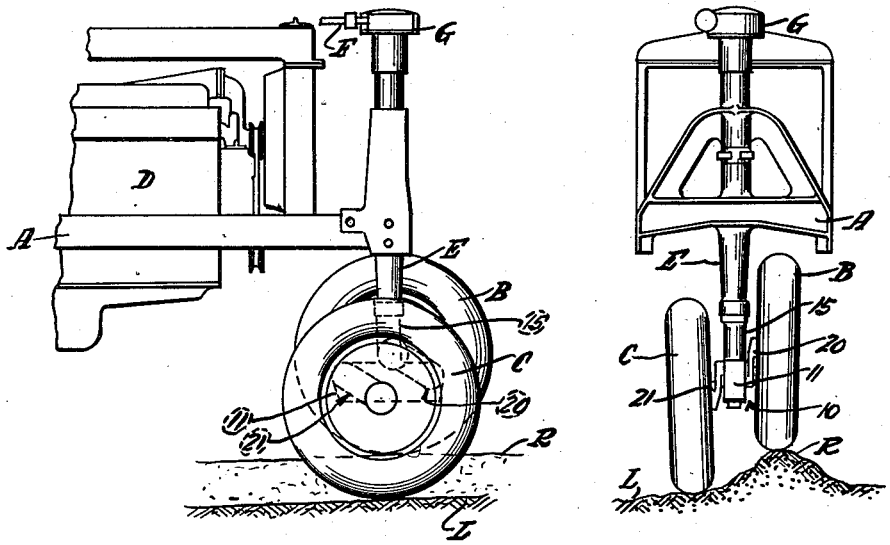
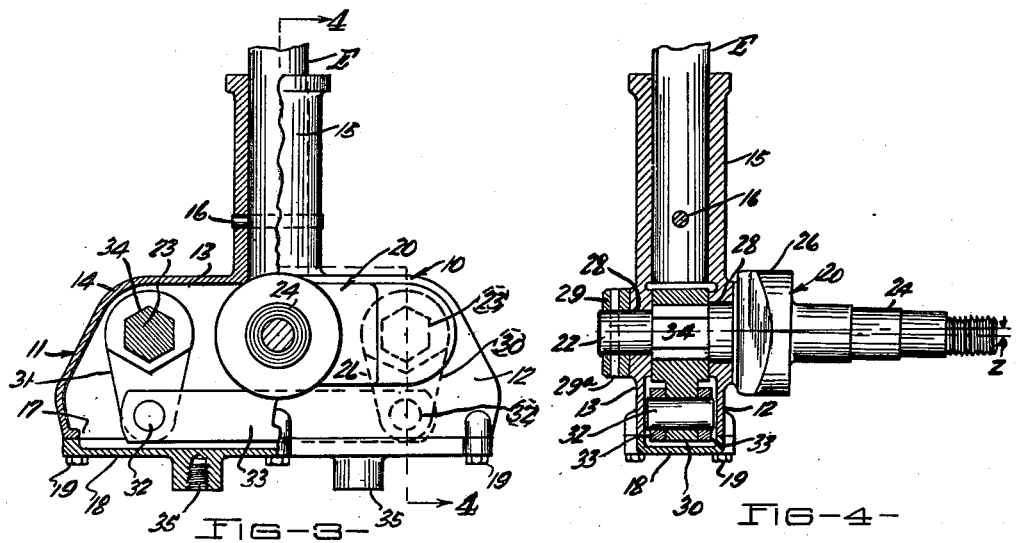
INVENTOR
ADOLPH RONNING
BY
ATTORNEY

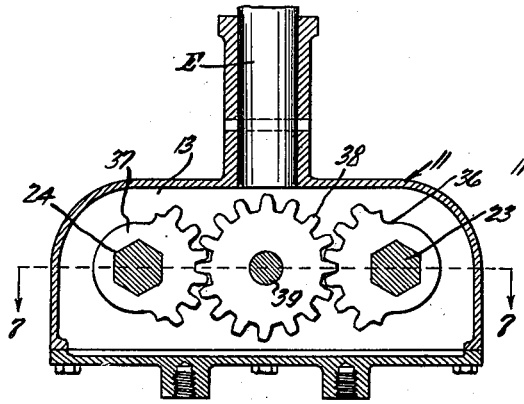
FIG-6-
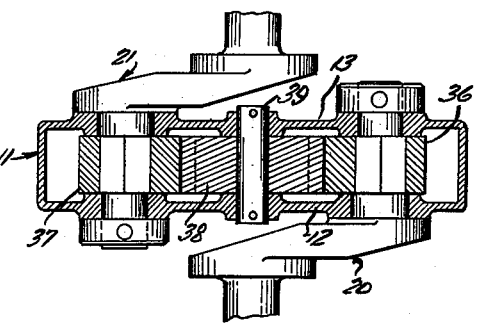
FIG-7-
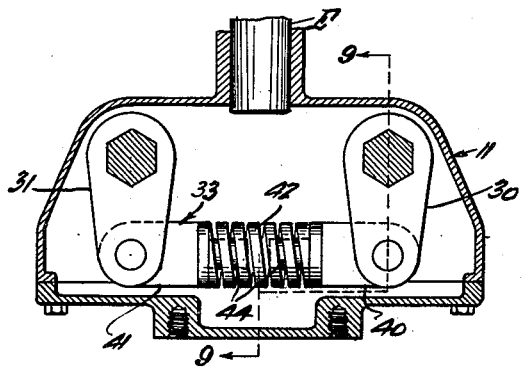
FIG-8-
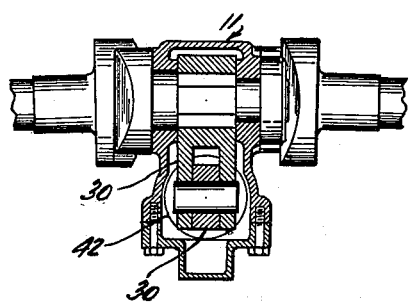
FIG-9-
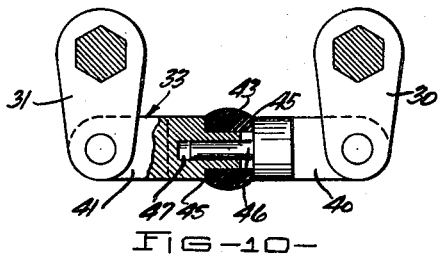
FIG-10-
INVENTOR
ADOLPH RONNING
BY
ATTORNEY Patented Sept. 2, 1941

2,254,451

UNITED STATES PATENT OFFICE 2,254,451

MOUNTING FOR VEHICLE WHEELS

Adolph Ronning, Minneapolis, Minn.

Application July 15, 1938, Serial No. 219,369

26 Claims. (Cl. 280—87)

This invention relates to improvements in vehicle wheel mountings.

The invention particularly contemplates the improvement of the mountings for the relatively closely spaced frontal dirigible or steering wheels of row crop tractors, but the same mounting assembly and method may be applied to all kinds of vehicle wheels, whether closely spaced or not, and whether used for steering purposes or rigidly mounted for supporting purposes alone. However, for convenience in this disclosure the mounting means will be illustrated and described as applied to row crop tractors since it is in this assembly that my invention serves with possibly the greatest benefit. Such tractors generally embody a central, vertically axised steering post, and to the lower end of which the wheels are connected by a relatively short transversely extended axle, rigidly affixed to the shaft. This closely spaced wheel assembly is, perhaps, perfectly satisfactory when operating on a level surface and, of course, is used in order to allow the wheels to operate between crop rows without damage to the plants. However, in side hill work or where one wheel runs upon an elevation higher than the other, this rigid (transversely) wheel mounting has numerous disadvantages. Chief of these is the fact that the wheel running on the higher elevation has a natural tendency to elevate the frontal end of the tractor so that the other wheel clears the ground and side slipping on the side hills occurs very frequently for this reason. Also, this action puts the entire strain of supporting the frontal end of the tractor upon a single wheel resulting in a considerable stress being put on the steering and wheel supporting elements.

The primary object of my invention, therefore, is to provide a novel, simple and effective wheel mounting of such nature that the aforesaid side slippage, instability and unequal stresses may be avoided by permitting either wheel to rise as it encounters a rise of ground while the other may correspondingly descend to thereby cause a differential action between the wheels sufficient to maintain them both in even ground contact and distribute the weight equally to both wheels at all times.

Another object is to provide a wheel mounting assembly for this purpose which may be utilized for supporting wheels of either close spaced or of a relatively wide spaced type and which, in fact, will permit the attainment of lateral or transverse stability of close spaced wheels substantially equivalent to that of wide spread wheels as they are conventionally mounted.

Another object is to provide an assembly of this kind which may be applied to vehicles of existing types without disturbing any original equipment thereon or interfering with any of the normally used attachments therefor, and which furthermore is so compact that it may be applied to the wheels without requiring that they be spaced apart any greater distance than hitherto used.

A further object is to provide a wheel mounting assembly affording the described advantageous differential and equalizing action and which may be readily arranged to cushion the vehicle or tractor against shocks incident to the action of the wheels in traveling over rough ground.

Still a further object is to provide an assembly of this kind in which the working parts may be readily enclosed or encased to protect them against dirt and other foreign matter. This is, of course, of particular advantage in tractor work where the parts would necessarily be subjected to considerable dirt and dust.

These and other more detailed and specific objects will be disclosed in the course of the following specification, reference being had to the accompanying drawings, in which—

Fig. 1 is a side elevation of the front end portion of a row crop tractor showing my improved wheel mounting means in use and with the wheels in the position they assume when the left hand wheels meet a side hill or rise of ground.

Fig. 2 is a front end view of the assembly shown in Fig. 1.

Fig. 3 is an enlarged side elevation of the wheel mounting assembly, showing one half in vertical and fore and aft section.

Fig. 4 is a cross section along the irregular line 4—4 in Fig. 3.

Fig. 5 is a plan view of the assembly shown in Fig. 3, with outer end portions of the wheel supporting members broken off and the vertical steering post shown in horizontal cross section.

Fig. 6 is a vertical section through a modified wheel mounting assembly showing gear type connecting means in lieu of the link connection heretofore shown.

Fig. 7 is a horizontal section along the line 7—7 in Fig. 6.

Fig. 8 is a vertical section showing a parted link connection with an expansive coil spring interposed in the link for cushioning the tractor against shocks.

Fig. 9 is a cross section along the line 9—9 in Fig. 8.

Fig. 10 is a side view of a modified construction of the connecting link, with a resilient bumper or cushion for shock absorbing purposes.

Referring now with more particularity to the drawings, my invention is shown as applied to a row crop tractor of conventional form which includes the frame A supported at its rear end by traction wheels (not shown) and at its frontal end by closely spaced wheels B and C. The tractor is driven by the power unit D and is steered by oscillation of the vertical steering shaft or post E, to the lower end of which the front wheels B and C are mounted. The steering operation is carried out by a steering wheel (not shown) by which a shaft F is turned to actuate worm gears in the housing G atop the steering post.

The foregoing is the conventional construction of the parts and ordinarily the wheels B and C are journaled on a short axle secured transversely and rigidly to the steering post E. In accordance with my invention, however, I provide in lieu of the rigid axle a movable differential acting mounting which is designated generally at 10 and which will now be described in detail.

Referring to Figs. 1 through 5, I provide a housing or case 11 of hollow formation including the spaced sides 12 and 13, the integral top and end walls 14 joining these sides and the medial, tubular, upwardly extending mounting neck or member 15. This neck 15 fits upwardly over the lower end of the steering post E, and is rigidly secured to turn therewith by a diametrically extended pin 16 so that the main portion of the housing will fall at a level about even with the normal axle height of the front wheels B and C. The lower side of the housing is open, as shown at 17, but in use is closed by a bottom cover plate 18 removably secured in place by the cap screws 19.

Attention is directed to Figs. 2, 4, and 5, particularly wherein it is shown that the thickness of the housing, measured across the side walls 12 and 13, is actually only slightly greater than the diameter of the steering post E, and for this reason the wheels B and C may be mounted in very close spacing at each side of the housing with only a small clearance left for the play of the wheel support members or cranks 20 and 21. These cranks include the journals or mounting ends 22 and 23, the wheel mounting axles 24 and 25, and the connecting arms or cheeks 26 and 27. The journals 22 and 23 are rotatably mounted transversely through openings 28 in the housing sides 12 and 13 adjacent opposite front and rear ends of the housing 11, and are retained in place against axial displacement by collars 29 which are pinned at 29a to the extremities of the journals exteriorly of the housing. Interiorly of the housing these journals carry the short levers 30 and 31 which normally depend from the journals and are pivotally connected at their lower ends at 32 to spaced connecting links or bars 33 extended longitudinally, or in fore and aft direction, in the housing. The journals 22 and 23, at the point at which they pierce the levers 30 and 31, are made of multilateral cross section, as indicated at 34, to non-rotatably fit similarly shaped sockets in said levers.

The wheels B and C are journaled on the crank axles 24 and 25 which are extended laterally outward for this purpose, and the parts are so proportioned and arranged that normally these axles will stand in substantial alignment axially and due to the fact that the cranks normally extend in opposite directions horizontally from their journalled connection to the housing 11, the axles will furthermore stand in alignment with the center of the steering post E. The wheels are as effectively supported in normal operation as though they were mounted upon axles rigidly affixed to the steering post, since the upward strain on the wheels by contact with the ground is evenly supported and opposed by the links 33 joining the levers 30 and 31.

However, should one wheel, for instance B, strike a rise or ridge of ground R shown in Figs. 1 and 2, an added upward pressure will be exerted on this wheel with a momentary resulting lessening of pressure upon the other wheel C riding the normal level L of the ground. As a result, the wheel B may move upwardly, swinging the crank 20 upwardly on its journal 22. This action swings the lever 30 to the left, as viewed in Fig. 3, moving the links 33 endwise and causing the lever 31 to have a corresponding movement which, when transmitted to the other crank 21, moves the wheel C downwardly. The pressure is thus equalized between the wheels and the tractor is supported evenly without either any lateral tipping or raising and lowering of its frontal end. The differential action between the wheels takes place at any time that either meets an uneven resistance or ground level, and free play of the wheels is at all time permitted without any effect on the tractor height or balance.

It will be evident that in the situation illustrated in Figs. 1 and 2, the rigid axle mounting of the wheels as heretofore employed would cause the left hand wheel to ride upon the ridge R while the right hand wheel would be held clear of the ground. The front end of the tractor would thus be raised above its normal level and, due to this one wheel support, the lateral stability would be destroyed to a large extent. Or, on the other hand, the left wheel might slip down the ridge, resulting in a deviation from the normal path of the tractor. In any event, considerable side slipping would occur, the wheel axle would be put under great strain, and steering would be made very difficult.

Such is not the case, however, in the use of my wheel mounting, since lateral stability is maintained and the load will be equalized between the wheels at all times. In fact the stability will be found to be equal to the wide spread wheels sometimes used on different types of tractors. It may be noted, too, that these beneficial effects are secured without requiring a widening of the front wheel assembly or spacing the wheels apart any greater distance than heretofore, and without interfering in any way with any auxiliary tractor equipment such as cultivators or other implements which may be intended for use alongside the front portion of the tractor. The working parts are mainly enclosed within the housing 11, and are accordingly protected from dirt, dust, and other foreign matter which might have a tendency to interfere with the normal operation of the parts.

The cover plate 18 is provided with integral tapped socket members 35 by which the usual auxiliary steering equipment (not shown) may be attached for steering the tractor from a cultivator or other implement.

It will be noted, particularly in Figs. 2 and 4, that the axles 24 and 25 are set at a slight angle outwardly and downwardly as indicated at Z in Fig. 4. This angle sets or disposes the wheels B and C at an inwardly turned angle toward their lower edges and provides the camber found desirable for steering convenience.

In Figs. 6 and 7 the construction and parts are identically the same as heretofore described, but in lieu of the levers and links heretofore described for connecting the journals 23 and 24 of the crank members 20 and 21 within the housing 11, I provide each journal with a rigidly affixed gear segment 36 and 37 which mesh with an intermediate gear 38 journaled by the shaft 39 in the housing sides 12 and 13. The action is exactly the same, and as either wheel moves upwardly the other will be moved downwardly an equal amount by action of the gears, as will be understood.

Figs. 8, 9, and 10 illustrate further modifications of my invention, wherein means is provided for cushioning the tractor or vehicle from shocks and jars occasioned by travel over rough ground. In these structures the housing 11 and levers 30 and 31 are substantially the same as previously described, but the links 33 are parted and formed in two equal end sections 40 and 41, which are braced apart by means of either an expansion coil spring 42 or a rubber collar 43. The levers 30 and 31 are split to form forks and the links are pivotally mounted at their ends in the forks. The spring 42 is retained in place by reduced, extended pins 44. The rubber collar 43 is retained in place between shoulders 45 formed on the rounded medial portions of the link sections and the links may be retained in alignment by a pilot pin 46 slidably mounted in a recess 47, as clearly shown. In either case the resilient members serve to yieldably oppose upward movement of either wheel B or C due to contact with uneven places on the ground, and so cushion the tractor or vehicle against shocks.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. Mounting means for the steering wheels of a vehicle comprising a turnable supporting member at the front end of the vehicle, arm elements movably extended in opposite longitudinal directions from separate bearings in the supporting member and having freedom for interdependent opposite movement in transversely spaced vertical planes disposed parallel with each other and with respect to the direction of travel, and axles extended from the said arm elements for engagement in the wheels.

2. A vehicle wheel mounting including a steerable supporting member, a housing secured to the member, crank members separately journaled in the said housing, axles extended from the crank members for carrying the vehicle wheels, levers connected to the cranks, and link means connecting the levers for causing opposite vertical movement of the cranks when the wheels travel over irregular ground surfaces.

3. A vehicle wheel mounting including a steerable supporting member, a housing secured to the member, crank members journaled in the said housing and extended therefrom, axles extended from the crank members for carrying the vehicle wheels, elements connected to the cranks within the housing, and means connecting the said elements to produce equal distribution of vehicle weight on the wheels while permitting opposite vertical movements of the wheels.

4. A vehicle wheel mounting including a steerable supporting member, a housing secured to the member, crank members journaled in the said housing, means on the crank members for rotatably securing the vehicle wheels, levers secured to the crank members within the housing, a link connecting the levers for moving the crank members in opposite directions in vertical planes, the said link having sections connected to the respective levers, and resilient means connecting the said sections.

5. A supporting and steering device for a vehicle comprising a member journaled at one end of the vehicle, crank arms mounted on said member for movement in vertical planes parallel with the direction of travel, ground wheels mounted on said crank arms substantially in the transverse vertical plane through the journaled member and vertically movable with the respective arms while also being steerable by rotation of the journaled member, and means connecting the crank arms causing them to move in opposite vertical directions when the respective ground wheels travel over relatively high and low surfaces.

6. A vehicle steering truck comprising a manually turnable member, a pair of cranks separately and independently journaled in the member for movements in reversely curved arcs and in spaced parallel planes, wheels mounted on the cranks, and means associated with the cranks causing them to move equally but in opposite vertical directions in response to wheel movement caused by irregularities in the ground surface traversed by the respective wheels.

7. In a steering truck for a vehicle, a member turnable about an upright axis with respect to the vehicle, a pair of laterally arranged connected cranks journaled in separate bearings in said member and extending one forwardly and the other rearwardly from their respective bearings, and wheels mounted on said cranks.

8. In a vehicle, a pair of cranks journaled with respect thereto and extending forwardly and rearwardly from their respective journal axes, ground wheels secured to the cranks with their axes in substantial alignment, and means connected with the cranks and operative upon up movement of one crank to produce a down movement to the other, said means including a device adapted to exert a cushioning effect as between the cranks and thereby also yieldably support the vehicle with respect to said wheels.

9. In a vehicle, a steerable mounting member, wheel supported cranks journaled on longitudinally spaced tranverse axes in said mounting member, and link connected arms extending from said cranks.

10. In a vehicle, a steerable mounting member, wheel supported cranks journaled on longitudinally spaced transverse axes in said mounting member, arms extending downwardly from the cranks, within the mounting member, and a rigid link connecting said arms and operative to effect movements of the cranks and wheels in opposite vertical directions.

11. In a vehicle, a steerable mounting member, wheel supported cranks journaled on longitudinally spaced transverse axes in said mounting member, and yieldable means operatively connecting the cranks to move them in opposite vertical directions.

12. In a vehicle, a steerable mounting, a pair of stub shafts journaled in the mounting, said shafts being transversely arranged and longitudinally spaced with respect to the direction of travel, a pair of ground wheels disposed at opposite sides of the steerable mounting, means connecting the wheels with the respective shafts in a manner by which relative vertical adjustments of the wheels will be coincident with oscillation of the respective shafts, and means connecting the shafts to produce oscillation of one by the other.

13. In a vehicle, a steerable mounting, a pair of stub shafts journaled in the mounting, said shafts being transversely arranged and longitudinally spaced with respect to the direction of travel, a pair of ground wheels disposed at opposite sides of the steerable mounting, devices connecting the wheels with the respective shafts in a manner by which relative vertical adjustments of the wheels will be coincident with oscillation of the respective shafts, and means including a yieldingly compressible element connecting the shafts to produce oscillation of one by the other.

14. A truck for supporting and steering the front end of a tractor comprising a pair of wheels arranged so that the transverse plane of the steering axis will pass through both wheels, arms supported by the wheels and movable in transversely spaced vertical planes from respective bearings on the truck, and differential mechanism connecting the arms in a manner causing one arm and its wheel to move upwardly when the other arm and wheel moves downwardly.

15. A truck for supporting and steering the front end of a tractor comprising a member mounted on the tractor for movement about a vertical axis, a pair of wheels arranged at opposite sides of said member and in positions to be intersected by the transverse plane of the said axis, relatively movable crank arms extending from the member and movable in planes disposed generally parallel with the direction of travel, means rotatably securing the wheels to the crank arms and differential mechanism operative to translate a down movement of one arm and wheel into an up movement of the other arm and wheel.

16. A vehicle wheel mounting including a medial supporting member steerable about a vertical axis, a housing secured to the member and steerable therewith, crank members journaled in the said housing and oppositely extended therefrom, axles extended from the crank members for carrying the vehicle wheels, and connecting means between the crank members and within the housing whereby the said wheels may have freedom for interdependent equal and opposite movements in transversely spaced generally upright planes.

17. A steering unit for a vehicle comprising a pair of arms each pivoted to the vehicle at one end and having a ground wheel supported at the other end, said arms being movable on said pivots to swing in generally upright planes parallel with the direction of travel and being also movable in a horizontal plane about an exis the transverse vertical plane of which passes through the wheels to steer said ground wheels, and means connecting said arms to translate an up movement of one into a down movement of the other to thereby equalize the weight pressure on said wheels and facilitate steering when traveling over irregular ground surfaces.

18. A steering device for a motor vehicle comprising a member mounted in the fore part of the vehicle for turning movement about a generally upright axis, a pair of ground wheels disposed at opposite sides of said member and in a transverse vertical plane through the axis, means connecting the wheels to the member and permitting up and down movements of the wheels in spaced planes disposed parallel with respect to the direction of travel while restraining the wheels from any relatively transverse movements, and differential means operatively associated with the wheel connecting means to permit relative up and down movements of the wheels, as when traveling over irregular ground surfaces, while retaining equal distribution of vehicle weight to both wheels.

19. A steering assembly for the front end of a vehicle frame comprising a vertical bearing sleeve rigidly mounted in said frame, a steering post journaled in the sleeve and extending with its lower end therebelow, a pair of ground wheels disposed at opposite sides of the post, a pair of cranks connecting the wheels to the said lower end of the post, said cranks being mounted for swinging movements in spaced planes disposed parallel with the direction of travel, and differential mechanism connecting the ends of the cranks that are attached to the posts to permit relative up and down movement of the wheels while equally distributing vehicle weight to both of the wheels.

20. A truck for supporting and steering the front end of a tractor comprising a pair of wheels arranged so that the transverse plane of the steering axis will pass through both wheels, arms supported by the wheels and movable in transversely spaced planes from respective bearings on the truck, and differential mechanism connecting the arms in a manner causing one arm and its wheel to move upwardly when the other arm and wheel moves downwardly.

21. A truck for supporting and steering the front end of a tractor comprising a pair of normally axially aligned wheels, a steerable member turnable upon an axis disposed between the wheels and intermediatee the fore and aft extremities thereof, crank acting arms connecting the wheels to the steerable member and movable in opposite up and down directions in spaced planes from bearings of said member, differential acting means connecting the arms, the parts being so constructed and arranged that the entire load of the tractor upon said truck will be transmitted solely and directly through the member bearings and arms to said wheels.

22. In a mounting for a pair of vehicle wheels, a longitudinal member, a pair of wheel-carrying assemblies, a wheel spindle in each of said assemblies; said spindles being substantially perpendicular to the plane of said longitudinal member, a hinge connecting each of said assemblies to said longitudinal member, said hinges being perpendicular to the plane of said longitudinal member, whereby said spindles may be moved up or down with respect to said longitudinal member, but will always be substantially perpendicular to the plane of said longitudinal member and the wheels on said spindles will always be spaced a constant distance from said longitudinal member, linkage joining said assemblies, said linkage including a connecting member resiliently variable as to length whereby to cushion sudden upward thrusts on either of said assemblies.

23. In a vehicle, a mounting for a pair of wheels including a wheel-carrying assembly supporting member adjustably secured to the frame of the vehicle, a pair of wheel-carrying assemblies, each of said assemblies including a wheel spindle, said spindles extending in opposite directions, each of said assemblies hinged to said member for up and down movement, the hinges of said assemblies being substantially parallel to said spindles, means connecting said assemblies, said means so constructed and arranged that upward movement of one assembly will cause a force to be exerted in the opposite direction on the other assembly, and said means including a resilient element adapted to cushion the shocks produced by sudden upward thrusts of either or both of said assemblies.

24. In a vehicle, a mounting member secured thereon, a pair of wheel-carrying assemblies hinged to said member for up and down movement and having wheel spindles disposed in substantial parallelism with the hinge axes, differential acting means connecting said assemblies, said means so constructed and arranged that upward movement of one assembly will cause a force to be exerted in the opposite direction on the other assembly, and said differential acting means including two members connected to the respective assemblies and an intermediate member connecting said two members, said intermediate member comprising two relatively movable sections and a resilient element connecting the sections with respect to each other to thereby cushion the shocks produced by sudden upward thrusts of either or both of said assemblies.

25. A wheel mounting for a vehicle frame comprising, a supporting member secured to the frame with freedom for movement with respect thereto, a pair of wheel supported arms hinged to the supporting member for movement in transversely spaced parallel planes, and linkage mechanism including a cushioning element, differentially connecting said arms to cause them to move in opposite vertical directions when traveling over irregular ground surfaces.

26. A wheel mounting for a vehicle comprising, a supporting member pivotally secured to the frame of the vehicle, a pair of wheel supported arms pivotally attached to the member for movement in substantially parallel, vertical planes, differential mechanism connecting the arms to translate the up movement of one arm into a down movement of the other arm, said mechanism including a resilient element for cushioning shocks produced by sudden upward thrusts of either or both of said wheel supported arms.

ADOLPH RONNING.